United States Patent [19]

Bunting et al.

[11] Patent Number: 4,762,445
[45] Date of Patent: Aug. 9, 1988

[54] COMPOSITE SINTERED TWIST DRILL

[75] Inventors: John A. Bunting, Provo; Kenneth H. Hanks, Orem, both of Utah

[73] Assignee: Precorp, Inc., Niles, Ill.

[21] Appl. No.: 740,260

[22] Filed: Jun. 3, 1985

[51] Int. Cl.[4] .............................................. B23B 51/02
[52] U.S. Cl. .................................... 408/144; 408/145; 408/230
[58] Field of Search ............... 408/144, 145, 209, 210, 408/227, 228, 229, 230, 705, 713; 175/410, 411, 329; 407/118, 119

[56] References Cited

U.S. PATENT DOCUMENTS

| 1,887,372 | 11/1932 | Emmons | 408/144 |
| 3,106,973 | 10/1963 | Christensen | 175/410 |
| 3,136,615 | 6/1964 | Bovenkerk et al. | 51/309 X |
| 4,160,616 | 7/1979 | Winblad | 408/144 |
| 4,359,335 | 11/1982 | Garner | 428/698 X |
| 4,403,015 | 9/1983 | Nakai et al. | 428/698 X |

FOREIGN PATENT DOCUMENTS

| 19461 | 11/1980 | European Pat. Off. | 408/145 |
| 79243 | 5/1983 | European Pat. Off. | 408/145 |
| 132652 | 2/1985 | European Pat. Off. | 408/145 |
| 686029 | 12/1939 | Fed. Rep. of Germany | 175/329 |
| 2236100 | 2/1974 | Fed. Rep. of Germany | 408/144 |
| 3119 | 1/1981 | Japan | 408/144 |
| 79879 | 5/1983 | Japan | 408/145 |
| 107806 | 6/1984 | Japan | 408/145 |
| 2085769 | 5/1982 | United Kingdom | 408/144 |

Primary Examiner—Z. R. Bilinsky
Attorney, Agent, or Firm—Dick and Harris

[57] ABSTRACT

A helically fluted twist drill apparatus in which offset, opposed veins of sintered abrasive particulate, such as diamond, are embedded within a drill blank made of a less abrasive material such as carbide. The non-aligned veins of abrasive material, in one embodiment, themselves intersect through juxtapositioning adjacent the point and web of the drill, and in another embodiment, rely upon the interpositioning of a third intermediate vein which, in turn, intersects at least part of both the first and second nonintersecting veins, to describe a more economical and effective highly abrasive material region at the drill point and web locations.

7 Claims, 1 Drawing Sheet

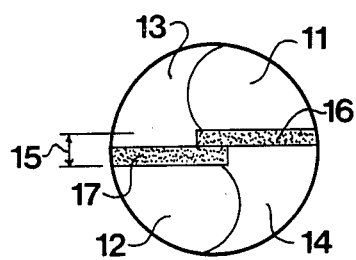
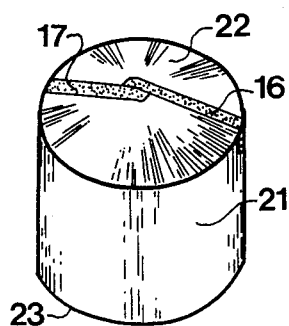
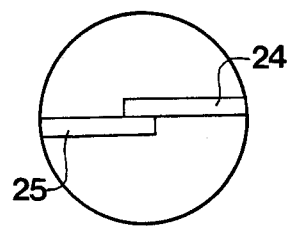
FIG. 1　　　　FIG. 2　　　　FIG. 3
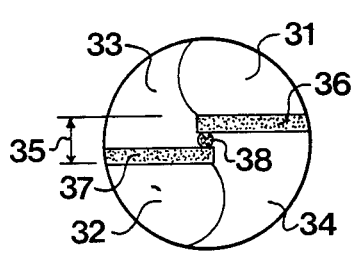
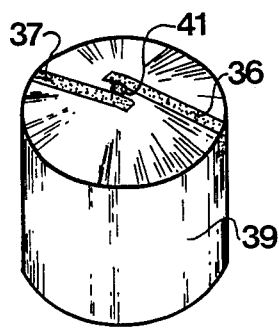
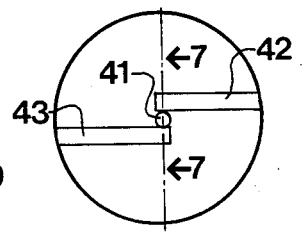
FIG. 4　　　　FIG. 5　　　　FIG. 6
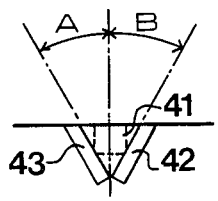
FIG. 7
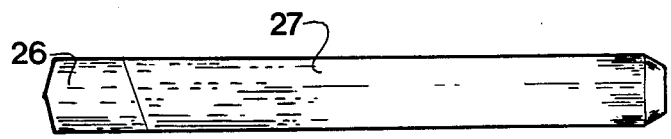
FIG. 8
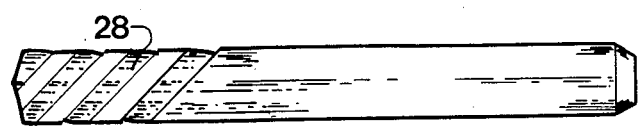
FIG. 9

COMPOSITE SINTERED TWIST DRILL

BACKGROUND

The present invention relates to drilling tools and more particularly to helically fluted twist drills larger than approximately 0.125 inches in diameter.

Helically fluted twist drills are the most commonly used drilling tools and are required to perform severe machining operations under extremely adverse conditions. The cutting end of a helically fluted twist drill includes a pair of cutting lips on opposite surfaces of an intermediate web, the width of which is typically 12 to 20% of the diameter, and a chisel edge extending obliquely across the center of the web. Such drills are typically long and slender and the helical flutes constitute a column eccentricity that further reduces rigidity under axial thrust load.

The concept of oppositely directed cutting surfaces at one extremity of a slender shaft which is both axially and torsionally loaded creates conflicting material demands in the construction of the drilling tool. The material of the cutting lips should be as hard as possible to cut the workpiece and as heatresistant as possible to maintain a cutting edge at elevated temperatures. At the same time the material of the body and shaft must be both rigid and tough to resist deflection and to hold up under the loadings imposed. These varying requirements have resulted in compromises in material selection, since hard materials tend to be brittle, while tough materials tend to wear easily.

To obtain an optimum combination of characteristics, i.e., hardness and wear-resistance at the cutting surfaces and toughness and rigidity of the body and shaft, it has been proposed to form the cutting surfaces of one material and the body and shaft of another. This has resulted in a variety of combinations, such as tungsten carbide or diamond inserts or tips on carbon steel or carbide shafts. These combinations, while individually useful, have a common disadvantage, i.e., the braze connection between the insert or tip and the shaft. Tungsten carbide can be soldered or brazed directly to the steel or carbide shaft. However, a diamond tip or insert must first be adhered to a carbide substrate which is in turn soldered or brazed to the shaft. Diamond particles are typically formed into a compact and bonded to a carbide substrate with a metallic catalyst in a high pressure/high temperature (HP/HT) press. However, at atmospheric pressure the metal which catalyzes the bonding of the diamond particles to each other and to the substrate in the press will also catalyze the back-conversion of diamond to graphite at temperatures above 700° C., causing disintegration of the compact. Accordingly, a low temperature solder or braze connection is used to attach the substrate to the shaft. This braze connection limits the effective life of such drilling tools, since it is softer than either the substrate or the shaft. The braze thus becomes the weakest point of the tool construction and the limiting factor in the tool usage.

In co-pending applications Ser. No. 515,777 and Ser. No. 793,202, a process is disclosed for depositing a vein of diamond particles in a groove in one extremity of a cemented carbide shaft. With this process the particles are bonded directly to each other and directly to the carbide material of the shaft, such that the connection between the particles and the carbide becomes the strongest part of the drilling tool. The process as disclosed has particular applicability to printed circuit board drills which have diameters of approximately 0.006 to 0.125 inches and in which the vein occupies the full width of the web which may be from 0.0012 to 0.030 inches wide. However, the process has not been applicable to large drills since cracking of the particle mass of the vein is encountered at vein widths of approximately 0.030 inches and above.

SUMMARY OF THE INVENTION

The present invention avoids the problems and limitations of the prior art known processes and products by providing a composite sintered twist drill and process of manufacture which is particularly suited for helically fluted twist drills larger than approximately 0.125 inches in diameter. This construction facilitates the use of a maximum quantity of materials having the optimum strength characteristics for the shaft and structural parts of the drill along with a minimum quantity of materials having the optimum hardness characteristics for the cutting surfaces of the drill. The hardest material is located in narrow veins at the leading edges of the web and across the mid line of the web and is bonded directly to the material of the web.

BRIEF DESCRIPTION OF THE DRAWINGS

FIG. 1 is a plan view of a first embodiment of a twist drill;

FIG. 2 is a perspective view of a composite sintered blank used with the embodiment of FIG. 1;

FIG. 3 is a plan view of the blank of FIG. 2 prior to sintering;

FIG. 4 is a plan view of an alternate embodiment of a twist drill;

FIG. 5 is a perspective view of a composite sintered blank used with the embodiment of FIG. 4;

FIG. 6 is a plan view of the blank of FIG. 5 prior to sintering;

FIG. 7 is a fragmentary view at an enlarged scale of a portion of the blank of FIG. 6;

FIG. 8 is an elevation view of a blank secured to a shaft; and

FIG. 9 is an elevation view of device of FIG. 8 fluted and finished to form a twist drill.

DETAILED DESCRIPTION OF THE DRAWINGS

The present invention adapts the formation of veins of abrasive particles bonded directly to the web to large diameter drills while retaining the advantage of greatly improved effective life realized in printed circuit board drills. In limiting the width of the veins and locating them at the leading edges of the web, extremely hard cutting edges are obtained. At the same time only the minimum quantities of abrasive particles are employed, with consequent savings in cost.

Referring to FIG. 1 of the drawing, an embodiment of the invention is illustrated which is particularly applicable to drills with webs of up to approximately 0.030 inches wide. As shown, flutes 11 and 12 define the lands 13 and 14 as well as the web 15. Oppositely directed cutting surfaces or lips are located on the exposed linear edges of the web. Narrow elongated veins 16 and 17 of sintered abrasive particles are imbedded in the margins of the web at the leading edges thereof and form the actual cutting surfaces or lips. The veins 16 and 17 extend inwardly from the circumference to the respective lands along chords which are equally spaced from a diameter of the drill and overlap at the midpoint of the web. The widths of the veins are selected so that veins overlap laterally and axially at the midpoint to form a short vein section across the full width of the web at the midpoint.

A generally cylindrical cemented carbide blank 21, FIG. 2, having a diameter approximately equal to that of the desired drill and a length of two or three times the diameter, is provided with a conical end 22 and a flat end 23. The material of the blank is preferably a tungsten carbide composition and is selected with emphasis on such characteristics as transverse rupture strength, toughness, ease of brazing or welding and ease of grinding, rather than wear resistance. As shown in FIG. 3, the conical end 22 is provided with a pair of grooves or slots 24 and 25 approximately 0.010 to 0.020 inches wide and approximately 0.030 to 0.050 inches deep. Diameter 50 of carbide drill blank 21 together with mid-axes 24a and 25a, of vein slots 24 and 25 respectively, are additionally shown. Mid-axes 24a and 25a are substantially parallel to each other and, are in turn parallel to diameter 50 passing between vein regions 24 and 25, with each of the vein regions positioned on an opposite side of the drill blank diameter passing therebetween. The slots can be formed with a die when the blank is molded or by grinding of the finished blank. The slots extend from the periphery along parallel, spaced chords past the central axis of the blank so that the interior extremities overlap a short distance. A well blended mixture of abrasive particles, such as diamond or cubic boron nitride, is then packed firmly into the slots so as to completely fill them. The abrasive particles are preferably 1-3 micron, but can be as large as 6-12 micron. The blank is placed in a refractory metal can which is then capped with a refractory metal disc and vacuum outgassed. The can is then placed in a HP/HT press and subjected to pressures of 45 Kbar to 75 Kbar and temperatures of 1200° C. to 1600° C. for approximately 1-10 minutes to sinter the abrasive particles. Apparatus and techniques for such sintering are disclosed in U.S. Pat. Nos. 2,941,248; 3,141,746; 3,745,623; and 3,743,489 (incorporated herein by reference). When the abrasive mixture is well sintered with particle-to-particle bonding and is bonded directly to the cemented carbide, the can is removed from the press. The refractory metal is removed from the composite blank 26 and the flat end 23 is ground to an angle of approximately 30° to 45° with the central axis to provide an enlarged attachment area. The composite blank 26 is then secured to an elongated cemented carbide or tool steel shaft 27, FIG. 8, such as by a high temperature braze connection. The composite blank and the adjacent portion of the shaft are then helically fluted and finish-ground to form the body 28, FIG. 9, of the desired twist drill.

An alternative embodiment of the invention, which is applicable to larger diameter drills, is shown in FIG. 4. Similar to FIG. 1, the flutes 31 and 32 defined the lands 33 and 34 as well as the web 35. Narrow elongated veins 36 and 37 of abrasive particles are imbedded in the margins of the web at the leading edges thereof and form the cutting surfaces or lips of the drill. The interior extremities of the veins are joined by a disc or plug 38 formed of sintered abrasive particles which is concentric with the central axis of the drill. A generally cylindrical blank 39, FIG. 5, of cemented carbide having two flat ends and a diameter approximately equal to that of the desired drill is provided with a central bore 41 in one end. A pair of oppositely directed slots or grooves 42 and 43, FIG. 6, are ground or otherwise formed along spaced parallel chords of the blank extending inwardly from the periphery and tangent to the bore 41. The material surrounding the bore is then ground at a uniform angle to form a frusto-conical end on the blank. The slots are approximately 0.010 to 0.020 inches wide, and the slots and bore are approximately 0.030 to 0.050 inches deep. As illustrated in FIG. 7, the slots 42 and 43 do not extend parallel to the longitudinal axis of the blank, but instead, converge toward the longitudinal axis at pre-determined angles A and B. The angles A and B are equal to each other and to the helix angle of the fluting. When the veins of particles are formed in the slots the veins extend into the material of the blank at the helix angle. As the blank and shaft are fluted the veins are exposed along their full depth. Fluting of the blank and the shaft is thus simplified since the hard material of the vein is not removed during the fluting process. While the bore, conical end and slots are described as drilled and ground, they may be formed in the blank during the molding process. As with the embodiment of FIG. 1, the slots 42 and 43 and the bore 41 are firmly packed with a blended mixture of abrasive particles and sintered in a HP/HT press at 45 Kbar to 75 Kbar and 1200° C. to 1600° C. for 1-10 minutes to bond the particles to each other and to the carbide of the blank. The composite blank is then secured to a shaft and the blank and shaft helically fluted and finished to form the twist drill.

What is claimed is:

1. A helically fluted twist drill apparatus in which a drill shaft is operably and restrainably integrated to a drill blank of a first material, into which drill blank one or more regions of a second, highly abrasive particulate material are rigidly located and affixed through sintering, to in turn create a web, point and one or more flutes having cutting edges of said sintered abrasive particulate material within said first material, upon helical fluting thereof, as well as upon grinding and finishing of same, said twist drill apparatus comprising;

a drill blank of said first material having a cylindrically shaped region with a top and bottom side, said drill blank including a generally conically shaped point region of said first material with said point at said top side of said cylindrically shaped region;

a first vein of sintered abrasive particulate, in the shape of a substantially narrow radially offset rectangular polyhedron, extending from the top of said conically shaped point region into said cylindrically shaped region of said drill bank, from the circumferential edge of said drill blank inwardly to and past the axial center point of said drill blank;

a second vein of sintered abrasive particulate, in the shape of a substantially narrow radially offset rectangular polyhedron, extending from the top of said conically shaped point region into said cylindrically shaped region of said drill blank, from the circumferential edge of said drill blank inwardly to and past the axial center point of said drill blank so as to overlap, proximate to said axial center point, a portion of said first vein;

said first and second veins respectively meeting said circumferential edge of said drill blank at positions substantially 180° disposed from one another, the respective longitudinal mid axes of said first and second veins, at the surface of said point region, being positioned substantially parallel to one another as well as positioned on upper and lower oppositely positioned sides of the diameter of said drill blank passing therebetween, each said first and second veins connected by a region of sintered abrasive particulate over at least a portion of said web at the axial center point of said generally conically shaped point region; and said region of sintered abrasive particulate over at least a portion of said web, at the axial center point of said generally conically shaped point region, extending from the top of the upper one of said first and second veins to the bottom of the lower one of said first and second veins, with said region of said sintered abrasive particulate at the axial center point of said point region being radially wider in configuration than the radial width of either of said first and second veins.

2. The invention according to claim 1 in which at least a portion of said first vein and at least a portion of said second vein, are juxtaposed to one another proximate to the point of said generally conically shaped point region.

3. The invention according to claim 1 in which at least a portion of both said first and second veins extending downwardly into the cylindrically shaped portion of said drill blank, converge towards one another at the helix angle of the one or more helically shaped flutes for the twist drill apparatus.

4. The invention according to claim 1 in which the leading edges of both said first and second veins located within said drill blank are exposed in each of said one or more flutes, upon said helical fluting thereof, along at least one side of each of said one or more flutes of said twist drill apparatus.

5. The invention according to claim 1 in which each said first and second veins have rectangular cross sections which, taken together, are of a combined width equal in size to that of the web formed in said fluted, ground and finished twist drill apparatus.

6. The invention according to claim 1 in which said first material of said drill blank is carbide, said second highly abrasive particulate material comprising a compacted and bonded diamond particle material.

7. A helically fluted twist drill apparatus in which a drill shaft is operably and restrainably integrated to a drill blank of a first material, into which drill blank one or more regions of a second, highly abrasive particulate material are rigidly located and affixed through sintering, to in turn create a web, point and one or more flutes having cutting edges of said sintered abrasive particulate material within said first material, upon helical fluting thereof, as well as upon grinding and finishing of same, said twist drill apparatus comprising;

a drill blank of said first material having a cylindrically shaped region with a top and bottom side, said drill blank including a generally conically shaped point region of said first material with said point at said top side of said cylindrically shaped region;

a first vein of sintered abrasive particulate in the shape of a substantially narrow radially offset rectangular polyhedron, extending longitudinally from the top of said conically shaped point region into said cylindrically shaped region of said drill blank, from the circumferential edge of said drill blank inwardly to at least the axial center point of said drill blank;

a second vein of sintered abrasive particulate in the shape of a substantially narrow radially offset rectangular polyhedron, extending from the top of said conically shaped point region into said cylindrically shaped region of said drill blank, from the circumferential edge of said drill blank inwardly to at least the axial center point of said drill blank;

said first and second veins respectively meeting said circumferential edge of said drill blank at positions substantially 180° disposed from one another, the longitudinal mid axes of both said first and second veins, at the surface of said point region, being positioned substantially parallel to one another as well as positioned on opposite sides of the diameter of said drill blank passing therebetween and, each said first and second veins connected by a region of sintered abrasive particulate over at least a portion of said web at the point of said generally conically shaped point region;

one or more intermediate veins operably positioned between said first and second vein, said one or more intermediate veins extending downwardly into the conically shaped point region of said drill blank from the point of same, the uppermost surface of said one or more intermediate veins, at the point of said conical point region, intersecting with at least a portion of both said first and second veins.

* * * * *

UNITED STATES PATENT AND TRADEMARK OFFICE
CERTIFICATE OF CORRECTION

PATENT NO. : 4,762,445
DATED : Aug. 9, 1988
INVENTOR(S) : John A. Bunting, Kenneth H. Hanks It is certified that error appears in the above-identified patent and that said Letters Patent is hereby corrected as shown below:

Col. 2, line 11        After "prior" delete "art"

Col. 2, line 49        After the second occurrence of "to" delete "large" and insert instead -- larger --

Signed and Sealed this

Thirteenth Day of December, 1988

Attest:

DONALD J. QUIGG

*Attesting Officer*        *Commissioner of Patents and Trademarks*